Jan. 4, 1966 J. T. McNANEY 3,228,024

DATA CONVERTER

Filed Aug. 20, 1962 2 Sheets-Sheet 1

INVENTOR.

Joseph T. McNaney

INVENTOR.

Joseph T. McNaney

United States Patent Office 3,228,024
Patented Jan. 4, 1966

3,228,024
DATA CONVERTER
Joseph T. McNaney, 8548 Boulder Drive, La Mesa, Calif.
Filed Aug. 20, 1962, Ser. No. 218,065
4 Claims. (Cl. 340—347)

This invention relates to data converters of the type designed to convert the angular position of a light beam to a pulse-code output signal.

The conversion of analog information to digital data represents perhaps one of the greatest barriers to digital flight control. This is particularly true since all physical phenomena and manmade signals to which it responds are analog, and the fact that the data converters developed to date are too complex and cumbersome for such widespread applications. The areas in which an improved analog to digital converter is needed most urgently in aerospace systems are stabilization, flight control and communications systems of aircraft, missiles and spacecraft, since the trends here point clearly to digital techniques.

It is therefore an object of this invention to provide an analog to digital converter which is relatively simple in construction, positive in operation, compact and trouble-free in continued use.

It is a further object of this invention to provide a data converter of the type referred to which utilizes the light conducting efficiency of fiber optics in converting the angular position of a light beam to a pulse-code output signal.

It is another object of this invention to provide a data converter which lends itself to microminiaturization techniques.

Numerous other objects, of course, will appear hereinafter as a description of the invention proceeds.

The novel features that are considered characteristic of this invention are set forth with particularity in the apppended claims. The invention itself, both as to its organization, and method of operation, as well as additional objects and advantages, will best be understood from the following description when read in connection with the accompanying drawings in which:

Figure 1:
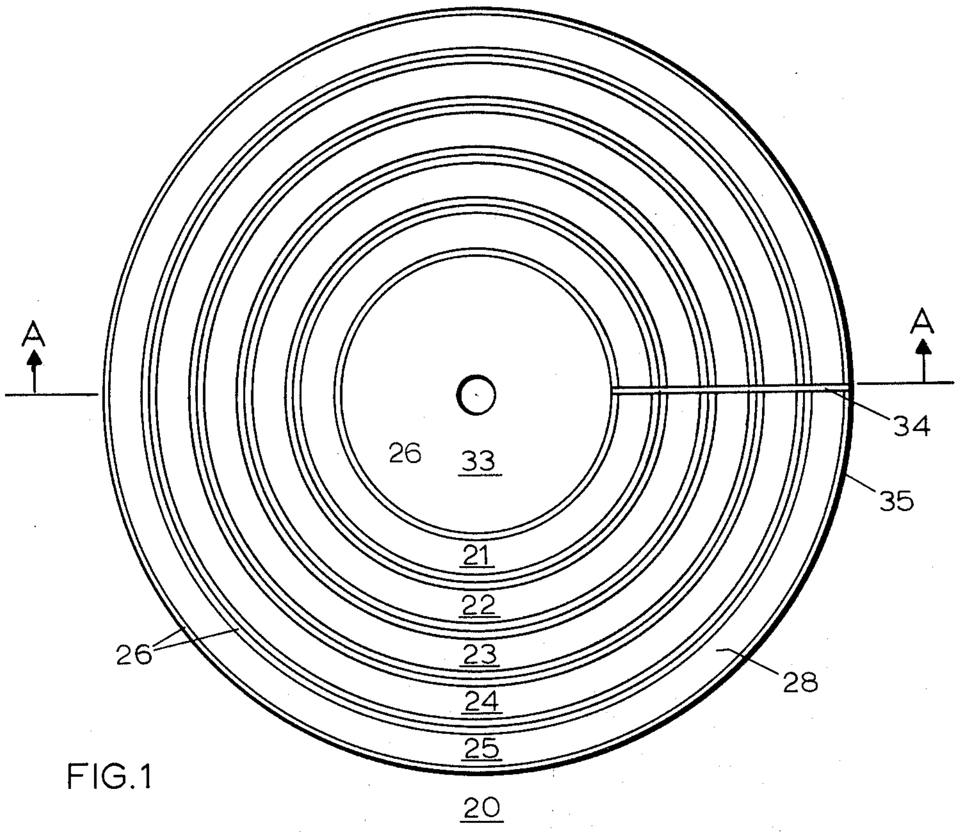
FIGURE 1 is a plan view of a light conductor assembly of the invention.
Figure 2:
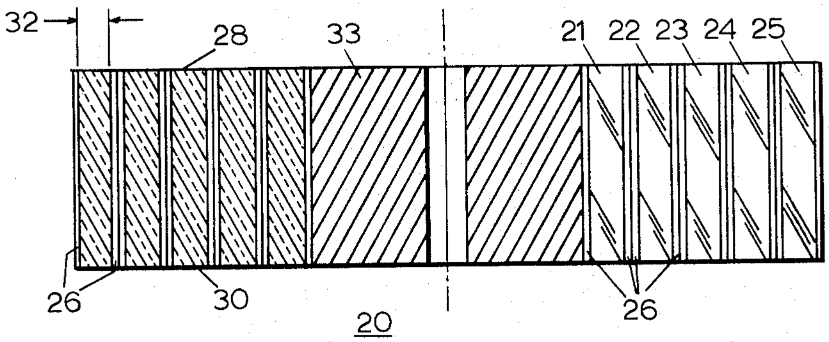
FIGURE 2 is a sectional view of FIGURE 1 through A—A.

Referring now to FIGURES 1 and 2, the principal part of the data converter is a light conductor assembly 20, being comprised of a plurality of light conducting means 21, 22, 23, 24 and 25, in the form of filamentary types of light guides or optical fibers, each having a predetermined index of refraction, and light conducting means 26 intermediate the light conducting means 21 through 25 having an index of refraction less than the predetermined index of the latter. It is preferred that the filaments, or fibers, 21 through 25, have a cross section of such dimensions that their measurements from a first surface 28 to a second surface 30 will be several times greater than a thickness dimension 32. Such filaments or fibers can be made of a flint glass which may have, for example, an index of 1.80. They may be drawn down to small cross sectional dimensions along with a light conducting material 26 of a crown glass having, for example, an index of 1.50.

The light conductor assembly 20 may be made by winding a predetermined number of layers of light conducting means, such as fibers 21 through 25, within a jacket of light conducting means 26, on a support member or core 33, and then divide such a continuous winding into light insulated layers by cutting through the layers, 21 through 25 for example, along a line 34 from the core 33 to the extreme edge 35 of the assembly 20, and then by filling the spacing occupied by the line 34 with a light insulating material. The assembly 20 as illustrated, however, is comprised of a series of layers, 21 through 25, which have been set in their respective positions as individual layers. In either event, the layers of optical fibers 21 through 25 are radially displaced and light insulated from one another by means of the light insulating material 34 and the light conducting material or jacket 26, and then bonded together to form a mechanically rigid assembly 20. The light conducting material 26 on the opposing sides of the assembly 20 is removed to thereby provide a first optically finished surface 28 and a second optically finished surface 30. The opposing surface 28 and 30 are optically finished by suitably grinding and polishing to thereby make them readily adaptable to receive and emit light.

Figures 3, 4, 5:
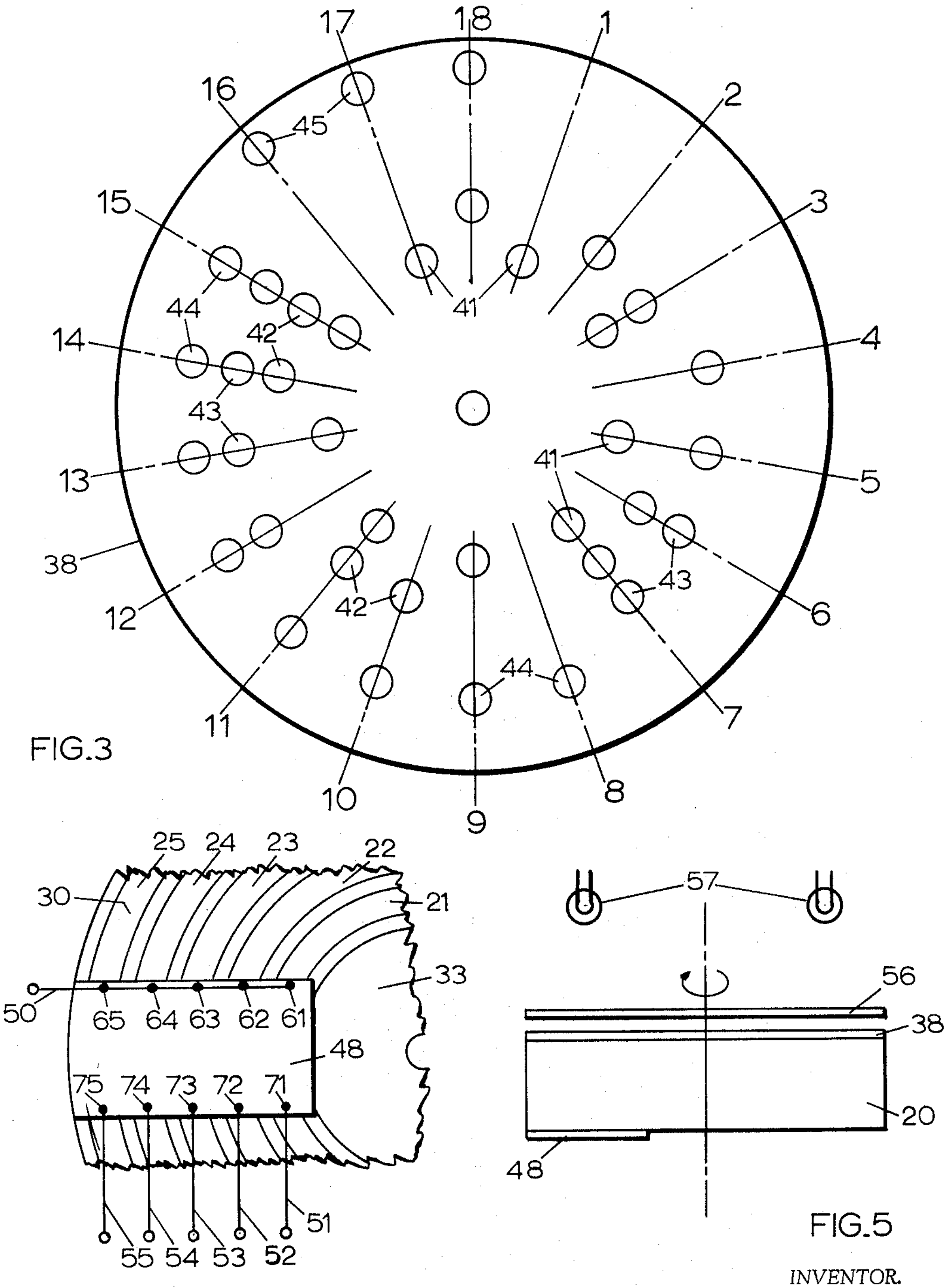
FIGURE 3 is a plan view of a light mask used in the data converter of the invention.
FIGURE 4 is a fragmentary view of the light conductor assembly and the photosensitive means of the invention.
FIGURE 5 is a side view of the data converter, showing the light beam positioning means, light mask, light conductor assembly, and photosensitive means.

The light mask 38 shown in FIGURE 3 contains a plurality of code related light transparent windows or openings through which light may pass. The mask 38 is designed to be placed on the surface 28 of the assembly 20 for the purpose of controlling the admission of light through the optically polished surface 28 of the optical fibers 21 through 25. The passage of light through the mask 38 will also be under the control of the angular position of a beam of light. The windows in the mask 38, therefore, are arranged in predetermined angularly displaced columns and radially displaced rows. For illustrative purposes, there are a predetermined number of windows 41 in a first row; a predetermined number of windows 42 in a second row; windows 43 in a third row; windows 44 in a fourth row; and windows 45 in a fifth row. The windows 41, 42, 43, 44 and 45 in their respective rows will coincide, respectively, with the radially displaced layers of fibers 21, 22, 23, 24 and 25 in the assembly 20. There are also a predetermined number of windows, 41 through 45, in angularly displaced columns 1 through 18.

An angularly positioned light beam will be adapted to select one column of radially displaced windows, 41 through 45, at any one time. For example, light from an angularly positioned light beam will be permitted to pass through radially displaced windows 42, 43 and 44, and through the surface 28 of fibers 22, 23 and 24, when such a light beam coincides with the center line of the column 14. Or, when such a light beam coincides with the center line of the column 1, light will be permitted pass through the window 41 in the first row, and through the surface 28 of the fiber 21.

Referring now to FIGURE 4, the fragmentary view of the assembly 20 includes light responsive means in the form of a layer of material 48 having photoconductive or photovoltaic characteristics. Such material may be in the form of selenium, cadmium sulphide, silver selinide, lead sulphide, telluride, and like materials. The layer 48 is provided with a common conductor 50, and individual conductors 51, 52, 53, 54 and 55. The common conductor 50 is operatively joined with the layer 48 at connecting points 61, 62, 63, 64 and 65, adjacent fibers 21, 22, 23, 24 and 25, respectively. The individual conductors 51 through 55 are connected operatively with the layer 48 at connecting points 71, 72, 73 74 and 75, adjacent fibers 21, 22, 23, 24 and 25, respectively. When the layer 48 is exposed to light, selectively, from fibers 21 through 25, current will be made to flow, selectively, between the common conductor 50 and conductors 51 through 55. A source of electrical energy may be coupled to the common conductor 50, and means for utilizing the effects of current flow may be coupled to the individual conductors 51 through 55.

An assembly of a light beam positioning means, consisting of a rotatable mask 56 and a source of light 57, the mask 38, the assembly 20, and the layer 48, is shown in FIGURE 5. The rotatable mask 56 is provided with a slit type of window (not shown) that will permit light from the source 57 to be exposed, selectively, to any of the columns, 1 through 18, of radially displaced windows 41 through 45, in the mask 38.

As indicated above, the plurality of windings of light conducting fibers 21 through 25 coincide with the radially and circumferentially arranged windows 41 through 45 in the light mask 38. Although I have shown but five windings of fibers 21 through 25, and eighteen columns and five rows of windows in the mask 38, it should, of course, be understood that the invention is not to be limited in this respect. The eighteen columns of windows will permit a 360° rotation of the mask 56 to be converted to eighteen individual code related output effects on the conductors 51 through 55 of the layer 48. If the eighteen columns of windows in the mask 38 are equally spaced the data converter will provide a code related output for each 20° of a complete rotation of the mask 56. Therefore, if there are 180 columns of windows employed in the mask 38 a code related output may be provided every 2°. Or, if there are 1,800 columns of windows employed, a code related output may be provided for each 0.2° rotation of the mask 56. Since there is a direct relationship between the columns and rows of windows in the mask 38, and the windings of fibers in the assembly 20, the 180 columns of windows will require eight radially displaced rows of windows and eight windings of fibers. And, the 1,800 columns of windows will require eleven radially displaced rows of windows and eleven windings of fibers, and so on. This, of course, implies the use of a 5-digit code for the conversion of 20° increments; an 8-digit code for the 2° increments; and an 11-digit code for the 0.2° increments.

Although there is shown in FIGURE 4 only a single layer of photosensitive material 48 joined with, and thereby optically coupled to, the surface 30 of the assembly 20, two or more such layers may be utilized in the invention for coupling output data to two of more isolated output circuit means. An individual group of code related light beams being reflected through the fiber assembly 20 will thereby be reflected to a plurality of electrically insulated photosensitive means 48.

Although I have limited myself, in the illustrations, to the showing of but a single embodiment of the invention, it should be understood by those skilled in the arts that the invention is not limited in this regard, since many of the other embodiments embracing the general principles and constructions hereinbefore set forth, may be utilized and still be within the ambit of the present invention.

The particular embodiment of the invention illustrated and described herein is illustrative only, and the invention includes such other modifications and equivalents as may readily appear to those skilled in the arts, and within the scope of the appended claims.

I claim:

1. Means for utilization in a data converter:

(a) a mask containing a combination of rows and columns of windows in which the path of each row winds about a common axis and each column represents coded data stationed about said axis in a predetermined angular position;

(b) a plurality of layers of light conducting fibers, each being adjacent to, and adapted to receive light from, said mask and wound about said axis so as to provide at least one fiber for each of said rows of windows;

(c) said fibers each presenting a light admitting surface, and a light emitting surface, and the light admitting surface of each fiber being fixedly adjacent a row of windows in said mask for receiving light from a window of each of the columns having a window in said row adjacent said light admitting surface; and (d) said light emitting surface of a fiber adjacent each row of windows being light coupled through said fiber to all of the windows of said row to thereby provide but one set of light emitting surfaces common to each and every column of windows in said mask.

2. The invention as set forth in claim 1 additionally including:

(e) light responsive means adjacent said set of light emitting surfaces.

3. The invention as set forth in claim 1 additionally including:

(e) light reflecting material intermediate said layers of light conducting fibers for controlling the reflection of light from said light admitting surfaces to said light emitting surfaces.

4. The invention as set forth in claim 1 additionally including:

(e) a source of light adjacent said mask and in a fixed position therewith; and (f) a rotatable light mask intermediate said source of light and said mask having a window rotatable about said axis for controlling the passage of light to said columns of windows as a function of the angular position of the window in said rotatable light mask.

References Cited by the Examiner

UNITED STATES PATENTS

| | | | |
|---|---|---|---|
| 3,033,731 | 5/1962 | Cole | 88—1 |
| 3,043,910 | 7/1962 | Hicks | 88—1 |
| 3,050,907 | 8/1962 | Hicks et al. | 88—1 |
| 3,060,789 | 10/1962 | Hicks | 88—1 |
| 3,101,411 | 8/1963 | Richards | 88—1 |
| 3,104,191 | 9/1963 | Hicks et al. | 88—1 |
| 3,122,735 | 2/1964 | Townsend | 340—347 |
| 3,125,812 | 3/1964 | Simpson | 88—1 |

OTHER REFERENCES

Publication: "Optical Placement Measuring Device," by Hamrick et al., IBM Technical Disclosure Bulletin, vol. 4, No. 7, December 1961, page 85.

MALCOLM A. MORRISON, *Primary Examiner.*

D. M. ROSEN, K. R. STEVENS, *Assistant Examiners.*